United States Patent [19]

Nakagawa et al.

[11] Patent Number: 4,812,730
[45] Date of Patent: Mar. 14, 1989

[54] VARIABLE-SPEED GENERATOR/MOTOR SYSTEM

[75] Inventors: Hiroto Nakagawa, Osaka; Yasuteru Oono, Minoo; Tadaatsu Kato, Takarazuka; Osamu Nagura, Katsuta; Sadahiko Niwa, Hitachi; Yosio Furukawa, Hitachi; Shigehiro Kayukawa, Hitachi, all of Japan

[73] Assignees: Hitachi, Ltd., Tokyo; Kansai Electric Power Co., Inc., Osaka, both of Japan

[21] Appl. No.: 35,035

[22] Filed: Apr. 6, 1987

[30] Foreign Application Priority Data

Apr. 7, 1986 [JP] Japan .................................. 61-78125

[51] Int. Cl.$^4$ ............................................. H02P 5/40
[52] U.S. Cl. .................................... 318/732; 318/705; 318/827
[58] Field of Search ............... 318/705, 719, 722, 161, 318/732, 827

[56] References Cited

U.S. PATENT DOCUMENTS

| | | | |
|---|---|---|---|
| 1,796,220 | 3/1931 | Seeley | 318/705 |
| 2,255,923 | 9/1941 | Griscom | 318/705 |
| 3,667,012 | 5/1972 | Kilgore | 318/161 |
| 3,829,757 | 8/1974 | Frank et al. | 318/722 |
| 4,321,478 | 3/1982 | Plunkett et al. | 318/161 |
| 4,481,455 | 11/1984 | Sugimoto et al. | 318/778 |
| 4,663,536 | 5/1987 | Roesel, Jr. et al. | 318/705 |

*Primary Examiner*—David Smith, Jr.
*Attorney, Agent, or Firm*—Fay, Sharpe, Beall, Fagan, Minnich & McKee

[57] ABSTRACT

A generator/motor system comprises a generator/motor having a primary winding and a secondary winding installed on the motor rotor coupled to a prime mover/load, a main circuit interposed between a power system and the primary winding of the generator/motor, an excitation circuit including a frequency converter inserted between a part of the main circuit and the secondary winding of the generator/motor, a frequency difference detector for determining the difference between the frequency of the power system and a frequency dependent on the rotational speed of the load, and a phase-shift control device for controlling the firing phase of the frequency converter in the excitation circuit by use of a signal from the frequency difference detector as a reference signal. In normal operation, a frequency signal following the frequency of the power system is produced, while at the time of a disturbance of the power system, the same frequency signal of the power system as before the disturbance continues to be produced thereby to keep the system in stable operation. For this purpose, a starting electric machine, a synchronous motor and a synchronous generator are aligned, and an output of the synchronous generator is applied to the frequency difference detector.

8 Claims, 5 Drawing Sheets

AT OPERATING IN POWER GENERATION MODE

DURING PUMPING

FIG. 6A
PRIOR ART
FIG. 6B
PRIOR ART
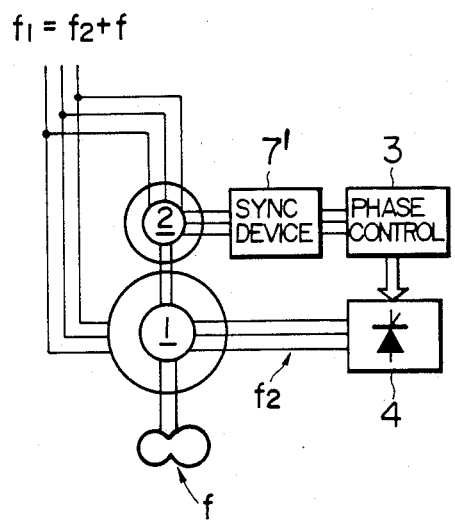
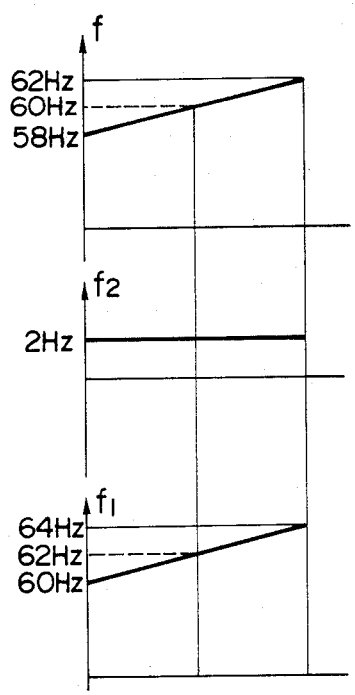
AT OPERATING
IN POWER
GENERATION
MODE

VARIABLE-SPEED GENERATOR/MOTOR SYSTEM

BACKGROUND OF THE INVENTION

The present invention relates to a variable-speed generator/motor system, or more in particular to a variable-speed generator/motor system which is capable of continuing to stably operate even under a disturbance caused by a fault or the like of an AC system.

A variable-speed generator/motor system has a well-known configuration as disclosed, for example, in U.S. Pat. No. 4,481,455. The primary winding of the generator/motor is connected to a power system through a main circuit including a circuit breaker and a main transformer, and the secondary winding which is installed on the generator/motor rotor directly coupled to a prime mover/load, is connected to the power system through a frequency converter and an excitation transformer. This system, which has a great advantage in that the rotational speed of the prime mover/load may be set regardless of the frequency of the AC system, already finds some applications for variable-speed pumped-storage power stations and flywheels. In applications to the variable-speed pumped-storage power station, for instance, the secondary winding of the generator/motor is installed on the rotor directly coupled with a water turbine/pump as a prime mover/load and excited by the frequency converter, so that the primary winding of the generator/motor (generator) is energized by the water turbine in power generation mode thereby to supply the power system with the power generated in the primary winding thereof. In motor (pumping) mode, on the other hand, the generator/motor is driven as a motor by the power from the power system, and water is pumped by a pump directly coupled to the rotor. In this case, in spite of the power system frequency which is fixed to, say, 60 Hz, the rotational speed of the water turbine/pump can be selected as desired independently, and it is thus possible to set the water turbine-pump to a rotational speed which maximizes the operating efficiency thereof.

The fact that a desired rotational speed can be set for the water turbine/pump is indicative of the fact that there is a frequency difference $f_2$ between the frequency $f_1$ of the power system and the frequency f $$\left( = \frac{P \times N}{120}, \right.$$

P: Number of poles) of the prime mover/load that is associated with the number N of r.p.m. Equation (1) is thus obtained.

$$f_2 = f_1 - f = f_1 - \frac{P \times N}{120} \tag{1}$$

The frequency $f_2$ of equation (1) is that of the secondary winding current, and it is possible to maximize the efficiency of the pump or water turbine while keeping the frequency $f_1$ of the power system at a fixed level. There are two main operating factors adjustable to satisfy the relationship of equation (1). One is the opening of a quide vane on the water path of the water turbine/pump, and the other is the firing angle of a thyristor making up a frequency converter. These operating factors are appropriately controlled by a target signal determined by the object of operation, etc. of the variable-speed pumped-storage power station involved, (for example, by using as a target signal or a load demand signal from a central load dispatching office), even in which case the relationship of equation (1) is held.

The firing angle control of a thyristor requires a sync signal in phase with the frequency of the AC system connected to the thyristor in addition to a control signal determined from the target signal. A method of detecting a phase signal as such a sync signal is well known as disclosed in Japanese Patent Publication No. 28613/75, in which the secondary winding of a wound-rotor induction machine for phase detection (phase detector) is arranged in axial alignment with the secondary winding of the main apparatus (generator/motor), the primary winding of the wound-rotor induction machine is connected to the power system in the same manner as the primary winding of the main apparatus, and the signal from the secondary winding of the wound-rotor induction machine is recovered as a sync signal. In this method, the wound rotor induction machine for phase detection and the main apparatus are connected to the same power supply, and therefore in the case of a system disturbance such as a frequency drop, the phase detector making up the wound-rotor induction machine detects a slip, thereby decreasing the output frequency of the main apparatus for aggravation of the disturbance.

To obviate the problem caused by a frequency drop, Japanese Patent No. 1161562 entitled "Pulse Phase-Shift Control System" suggests, taking an AC-DC converter for DC power transmission as an example, "a pulse phase control system comprising a voltage-regulation oscillator supplied with an AC system voltage as an input applied to an AC-DC converter and producing a sync signal in phase with the input, the system producing a firing pulse of a phase corresponding to the control signal, in which a signal associated with the phase of the system voltage immediately before a fault, if any, of the AC system is stored, and during the continuance of the fault of the AC system, the signal thus stored is used to energize the voltage-regulation oscillator". A function similar to this invention is required to be added also to a variable-speed generator/motor system. It is, however, impossible to do so without modification of the above-mentioned prior art system. Specifically, unlike in the cited patent wherein the voltage phase applied to the voltage regulation oscillator is that of the AC system voltage applied to the AC-DC converter, a signal generated in the secondary winding of a generator/motor (the signal of frequency $f_2$ in equation (1)) is applied to the frequency converter in the case of the variable-speed generator/motor system. According to the phase detector of Japanese Patent Publication No. 28613/75, the secondary voltage of a wound-rotor induction machine is stored as a sync signal. In determining a firing angle of the frequency converter by storing the voltage of frequency $f_2$, it is impossible for the frequency of the main circuit of the, generator/motor to coincide with that of the power system after a disturbance as will be explained later with reference to FIG. 6.

In spite of the foregoing explanation of a variable-speed generator/motor system, the generator/motor functions as a motor when the prime mover/load is used only as a load. This configuration is known as what is called the Scherbius system, to which the present invention is also applicable. In the description that follows, these systems will be collectively referred to as a variable-speed generator/motor system.

SUMMARY OF THE INVENTION

Accordingly, the object of the present invention is to provide a variable-speed generator/motor system which can be continuously operated even when a disturbance is caused in the power system by a fault or the like thereof.

According to the present invention, there is provided a variable-speed generator/motor system comprising a generator/motor including the primary winding and the secondary winding, a prime mover/load coupled to the variable-speed generator/motor rotor, a main circuit interposed between a power system and the primary winding of the generator/motor, an excitation circuit including a frequency converter inserted between a part of the main circuit and the secondary winding of the generator/motor, a frequency difference detector for determining the difference between the frequency of the power system and a frequency determined by the rotational speed of the load, a phase-shift control device for controlling the firing phase of the frequency converter in the excitation circuit by use of a signal from the frequency difference detector as a reference signal, and a sync device for producing a frequency signal following the frequency of the power system under normal operation and producing, in the case of a disturbance of the power system, the same frequency signal as before the occurrence of the disturbance, as a frequency of the power system which is one of the inputs to the frequency difference detector.

BRIEF DESCRIPTION OF THE DRAWINGS

FIGS. 6A and 6B are diagrams for explaining that stable operation is impossible with a sync device arranged at a position indicated by the prior art.

DESCRIPTION OF THE PREFERRED EMBODIMENTS

Figure 1:
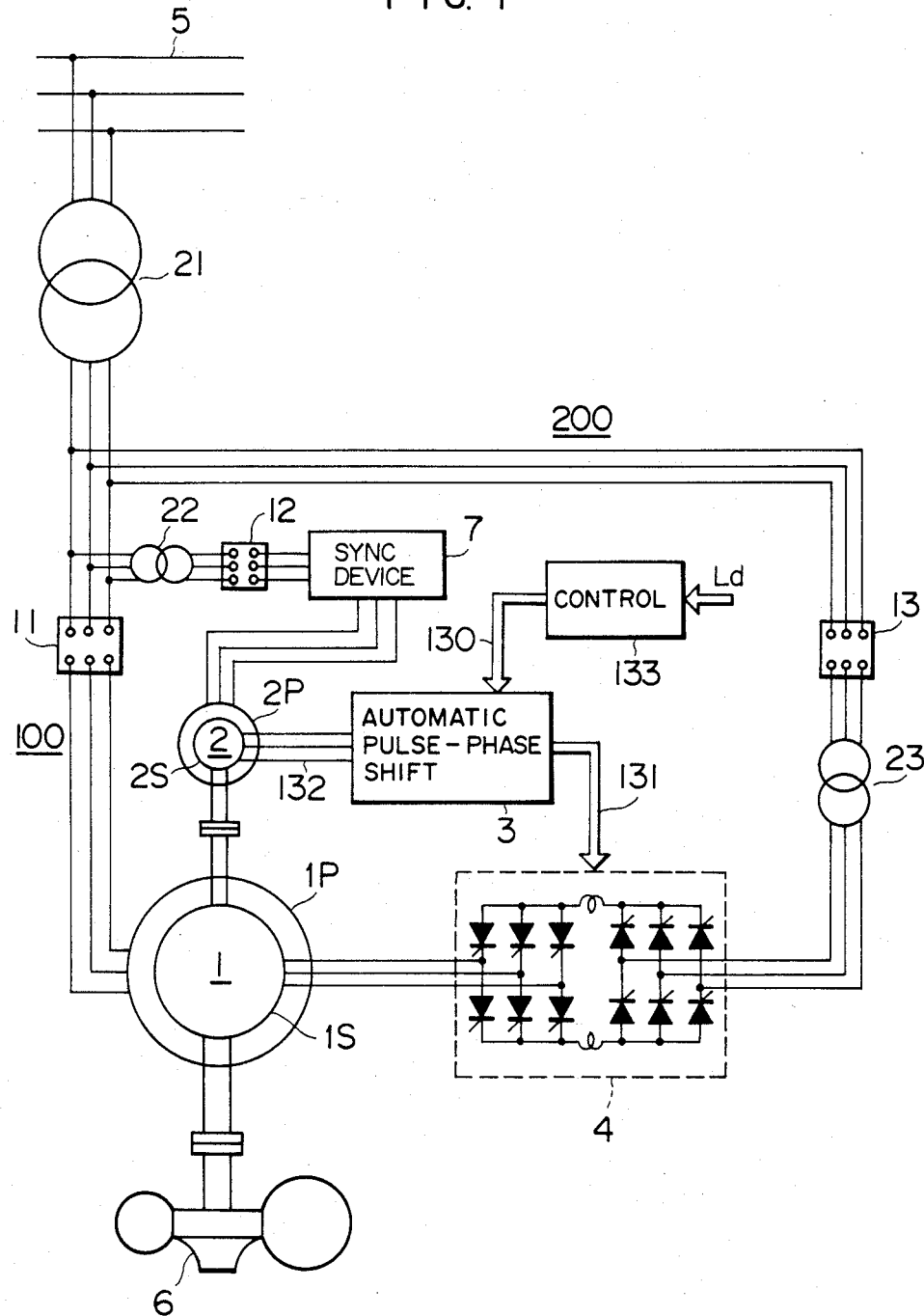
FIG. 1 is a diagram showing an embodiment of the present invention.
Figure 3:
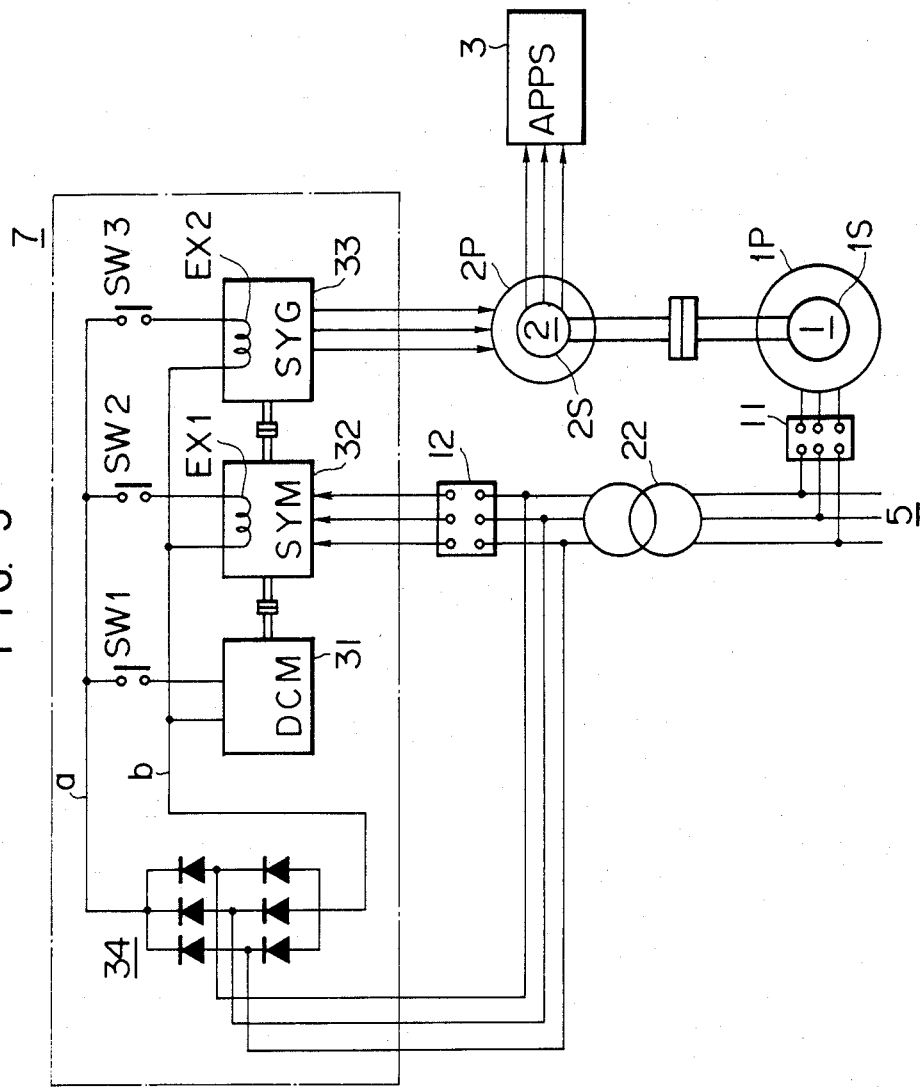
FIG. 3 shows an embodiment of the sync device added according to the present invention.

An embodiment of the present invention as applied to a variable-speed pumped-storage power station is shown in FIG. 1. In FIG. 1, the primary winding 1P of a generator/motor 1 is connected to a power system 5 through a main circuit 100 including a circuit breaker 11 and a main transformer 21. The secondary winding 1S of the generator/motor 1 is installed on the generator/motor rotor that is directly coupled to a water turbine/pump 6 making up a prime mover/load. On the other hand winding, is connected to the power system 5 through an excitation circuit 200 including a frequency converter 4, an excitation transformer 23 and a circuit breaker 13. In this configuration, a thyristor making up the frequency converter 4 is controlled by a firing signal 131 from an automatic phase-shift control device 3, which introduces a firing signal 131 from inputs thereto including a control voltage signal 130 determined by a control device 133 on the basis of a demand signal Ld, an AC voltage applied to the frequency converter 4 (the voltage across the secondary winding 1S of the generator/motor) and a reference phase signal 132. A phase detector 2, which is configured in the same manner as the generator/motor 1 making up a main apparatus, has the primary winding 2P thereof supplied with a voltage of an AC system 5 through an auxiliary transformer 22, a circuit breaker 12 and a sync device 7. The feature of the present invention lies in a sync device 7 arranged on the primary winding 2P side, which sync device 7 is configured as an example shown in FIG. 3. In FIG. 3, the sync device 7 is defined by a one-dot chain, and includes a starting DC machine 31, and two synchronous machines 32 and 33 having the same number of poles and the same relative positions of the stator winding and the magnetic poles. Explanation will be made about a case in which power is generated in this system.

First, an AC voltage produced from the power system 5 through an auxiliary transformer 22 is rectified in a rectifier 34 to produce a DC output at DC-side output lines a and b. This DC output is applied as a drive input to the starting DC machine 31 through a switch SW1 on the one hand, and to the exciting windings EX1, EX2 of synchronous machines 32, 33 through the switches SW1, SW2 on the other hand. The main winding side of the synchronous motor 32, by contrast, is supplied with an AC input through a circuit breaker 12. The AC output generated in the main winding of the synchronous generator 33 is applied to the primary winding 2P of the phase detector 2.

Figure 2A:
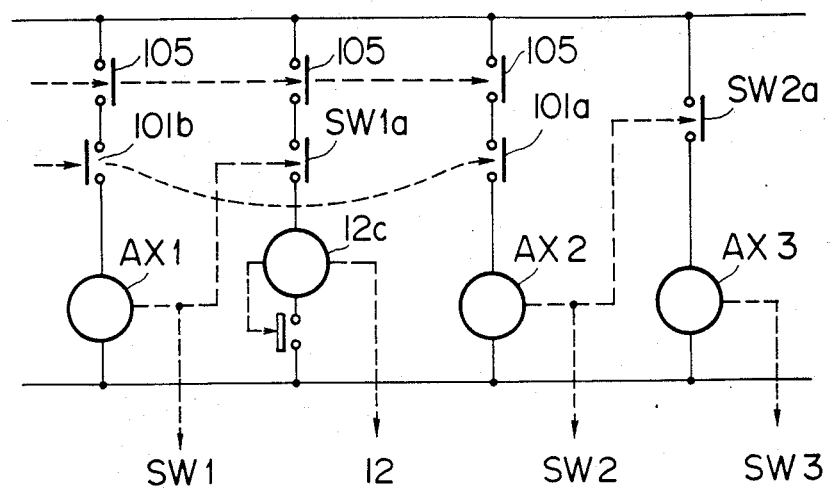
FIGS. 2A and 2B are diagrams showing the starting sequence of a sync system attached according to the present invention.
Figure 2B:
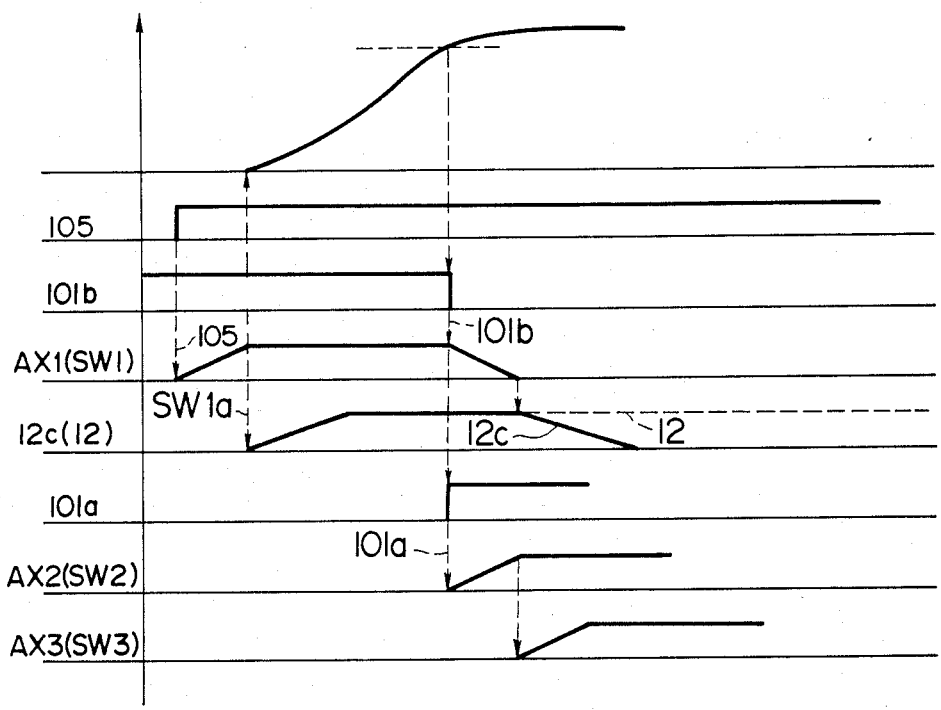

FIGS. 2A and 2B show a sequence for starting the sync device 7 of FIG. 3. In FIGS. 2A and 2B, reference characters AX1, AX2, AX3 designate auxiliary relays for driving the switches SW1, SW2, SW3 respectively shown in FIG. 3, and numeral 12C a closing coil for the circuit breaker 12. First, assume that a start command 100 of the sync device 7 is applied to close the contact 105. The auxiliary relay AX1 is energized through a normally-closed contact 101b which is adapted to open when the sync machines 32, 33 are ready for pull-in, so that the switch SW1 is closed thereby to start the starting DC machine 31. As the DC machine starts (switch SW1a closed) with the start command 105 applied thereto, the closing coil 12C is energized to close the circuit breaker 12. After this start (contact 105 closed), the speed of the DC machine 31 rises, and when the speed reaches such a point where it is decided that pull-in of the synchronous machines 32, 33 is possible, the normally-open contact 101a condition on a pull-in-ready decision is closed, the switch SW2 is closed by the auxiliary relay AX2 to apply a field to the excitation winding EX1 of the sync motor 32, thus completing the initial rise of the sync motor. At the time of closing of the normally-open contact 101a conditional on the pull-in ready decision, the normally-closed contact 101b thereof is opened, and the auxiliary relay AX1 is thus de-energized thereby to open the switch SW1. In this manner, the starting DC machine 31 finishes its function, and subsequently becomes a rotary machine load directly coupled to the sync motor 32. Upon excitation of the auxiliary relay AX2, the contact SW2a is closed and the auxiliary relay AX3 is energized, so that the switch SW3 thereof is closed to apply a field to the excitation winding EX2 of the sync generator or alternator 33, whereby the sync generator 33 applies an AC output to the primary winding 2P of the phase detector 21. In this case, the sync machines 32, 33 are of course constructed in such a way that the frequency and phase of the power system 5 coincide with those of the alternating current applied by the sync generator.

As explained in detail above, according to the present invention, first, the sync machines 32, 33 of the power system 7 are started by the DC machine 31, and at about the synchronous speed of the sync machines 32, 33, energization is effected to pull the sync motor 32 into the system 5. Then, upon energization of the sync generator 33, a voltage of a frequency in phase with the system 5 is generated across the sync generator 33. At the same time as the power system 5, the generator/motor 1 is started by the pump/water turbine 6 and accelerated up to about the sync speed. Under this condition, the primary winding of the phase detector 2 is excited by the output of the sync generator 33, and the frequency converter 4 is controlled by the slip frequency generated in the secondary winding of the phase detector 2. When the generator/motor 1 is thus energized, a voltage in phase with the system 5 is generated across the primary winding of the generator/motor 1. The circuit breaker 11 is then closed to perform the operation in power generation mode synchronously in parallel with the power system 5.

Figure 4:
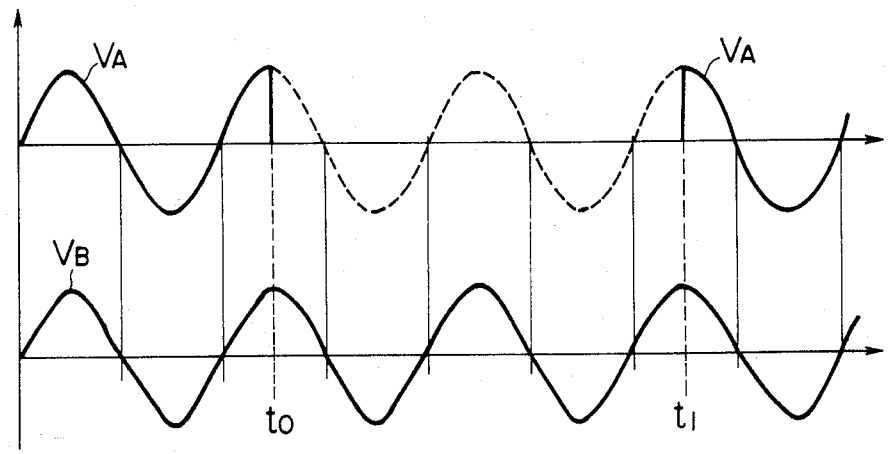
FIG. 4 is a diagram for explaining the operating principle of the sync system.

The system according to the present invention described above operates in the manner explained below in case of a disturbance of the power system. FIG. 4 shows a voltage $V_A$ generated in the main circuit 100 when a fault of the power system 5 occurs at time point $t_0$ and the circuit breaker is reclosed at time point $t_1$. During the period from $t_0$ to $t_1$, the main circuit voltage $V_A$ remains substantially zero, and the reference phase signal required for the automatic phase-shift control device 3 is lost. After time point $t_1$, the main circuit voltage is restored with the same frequency and phase as before the fault. This is by reason of the fact that the power system 5 has such a large electrical inertia that the phase remains virtually unchanged during a short period as between $t_0$ and $t_1$. To the extent that the signal $V_B$ of the main circuit 100 of the same frequency and phase as before $t_0$ is secured between $t_0$ and $t_1$, therefore, it is possible to use the automatic phase-shift control device 3 for firing control continuously even after $V_A$ is restored after $t_1$ as well as between $t_0$ and $t_1$. For this purpose, the mechanism of FIG. 3 is required to have a sufficiently large mechanical force of inertia.

Figure 5A:
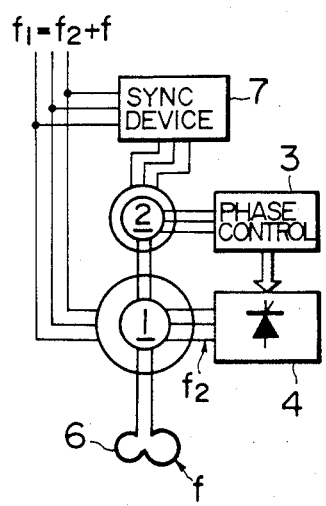
FIGS. 5A–5C are diagrams for explaining the stable operation can be continued by the system according to the present invention.
Figure 5B:
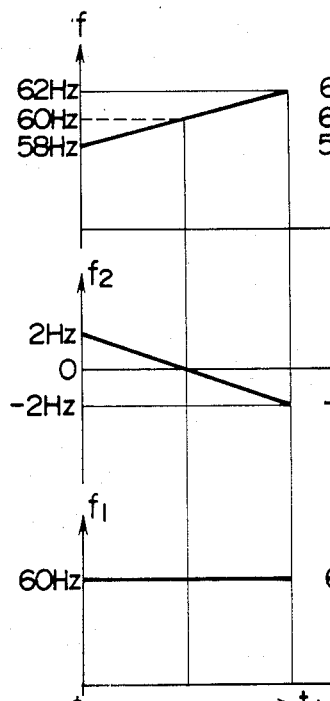
Figure 5C:
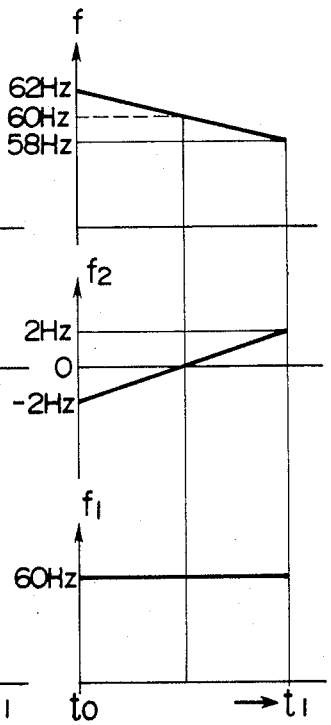

FIG. 5 is a diagram for explaining that a reference signal $V_B$ can be secured by the system according to the present invention. FIG. 5A shows a schematic configuration of the system of FIG. 1 and frequencies generated at various parts. FIG. 5B shows frequency fluctuations of various parts caused when this system is separated from the power system at the time of a worst fault thereof during the operation in power generation mode. In this case, the water turbine 6 is free of load, and therefore the number N of r.p.m. (and hence the frequency f) gradually increases from, say, 58 Hz before the fault. The output frequency of the sync device 7, in contrast, held to the rated level of 60 Hz, and the phase detector 2 produces a difference therebetween (the initial frequency of 2 Hz changes toward zero Hz, and then shifts in negative direction). With this signal as a reference, the firing is controlled with the result that frequency $f_2$ identical to the frequency of the secondary winding 2S of the phase detector 2 appears in the secondary winding 1S of the generator/motor 1. As explained with reference to equation (1), the frequency $f_1$ of the primary winding 1P of the generator/motor 1 is determined as a sum of the frequency $f_2$ of the secondary winding 1S thereof and the frequency f depending on the number N of r.p.m. The frequency $f_1$ is seen to be fixed at 60 Hz. It is thus understood that when the power system 5 is reconnected at time $t_1$, the synchronous state is maintained without hampering subsequent operation. FIG. 5C shows frequencies at various parts associated with a fault that may occur during pumping. In this case, the pump 6 loses its mechanical from the generator/motor input and the speed N begins to decline. Even under this condition, the sync device 7 continues to produce the same frequency as before the fault, so that the frequency $f_1$ is kept at rated level, as easily understood from the foregoing explanation.

FIG. 6 is for explaining that it is impossible to secure the reference signal $V_B$ with a sync device inserted at a position indicated by the prior art (on output side of 2S). FIG. 6A shows a schematic configuration of a prior art system involved and frequencies at various parts, and FIG. 6B frequency fluctuations of various parts when the system is separated from the power system under a worst fault while operating in power generation mode. In this case, the water turbine is free of load, and the number N of r.p.m, (and hence the frequency f) slowly rises from the level of, say, 58 Hz before the fault. The frequency $f_1$ on the primary winding 1P side, on the other hand, is determined as a sum $f+f_1$ which initially stands at 60 Hz. A sync system 7' stores and continues to produce the frequency difference 2 Hz of the secondary winding 2S of the phase detector 2. As a result of firing control with this signal as a reference, the frequency $f_2$ produced at the secondary winding 1S of the generator/ motor 1 is identical to that of the secondary winding 2S of the phase detector 2. As to the relations between the frequencies at various parts, as explained with reference to equation (1), the frequency $f_1$ of the primary winding 1P of the generator/motor 1 is determined as a sum of the frequency $f_2$ of the secondary winding 1S thereof and the frequency f dependent on the number N of r.p.m. This frequency change is upward from 60 Hz, and clearly indicates that the power system cannot be reconnected. The frequency during pumping, which is not shown, changes downward from 60 Hz with time.

According to the present invention, the phase detector 2 has a function to store the frequency and phase at the input side of the AC system, and in the case shown in FIG. 3, the mechanical inertia of generator/motor is used as a storage function. The same effect as that of the system described above can be realized by an alternative system with rotary machines combined on various principles, or by using an electrical storage function as in the prior art. For example, PLO (phase locked oscillation) function may be used or such data as phase and frequency may be stored and produced digitally. Further, as a phase detector 2, a rotary machine such as an induction motor may not be used but means for producing a frequency difference from an electrical subtraction.

It will thus be understood from the foregoing description that the system according to the present invention is capable of continuing to be operated out of phase with any disturbance that may occur in the power system, and therefore the disturbance of the power system is dampened thereby to improve the system stability.

We claim:

1. A variable-speed generator/motor system, comprising a generator/motor including a primary winding and a secondary winding, the secondary winding being installed on a motor that is coupled to a prime mover/load, a main circuit interposed between a power system having a power system frequency and the primary winding of the generator/motor, an excitation circuit including a frequency converter inserted between a part of the main circuit and the secondary winding of the generator/motor, frequency difference detector means having input means for receiving the power system frequency and a frequency dependent on the rotational speed of the prime mover/load for determining the difference between the frequency of the power system and the frequency dependent on the rotational speed of the prime mover/load a phase-shift control device for controlling the firing phase of the frequency converter in the excitation circuit, and a sync device means connected to the power system to receive as an input the power system frequency for producing a sync frequency signal following the frequency of the power system under normal operation and for outputting the sync frequency signal to the frequency difference detector means as the power system frequency input such that in the case of a disturbance of the power system, the same frequency signal of the power system as before the disturbance is produced continuously by the sync device means and is input to the frequency difference detector means.

2. A variable-speed motor system, comprising a generator/motor having a primary winding and a secondary winding, with the secondary winding being installed on the motor rotor that is coupled to a prime mover/load, a main circuit interposed between a power system having a power system frequency and the primary winding of the generator/motor, an excitation circuit including a frequency converter inserted between a part of the main circuit and the secondary winding of the motor, a frequency difference detector means receiving the power system frequency and a frequency dependent on the rotational speed of the prime mover/load for determining a difference between the frequency of the power system and the frequency dependent on the rotational speed of the prime mover/load and for outputting the determined frequency difference, phase-shift control device means receiving the frequency difference output for controlling the firing phase of the frequency converter in the excitation circuit by use of the frequency difference output as a reference signal, and synchronous device means for producing a frequency signal following the frequency of the power system under normal operation and and for outputting the frequency signal to the frequency difference detector means as the input such that in the case of a disturbance occurring in the power system, the synchronous device means continues to output the frequency signal to the frequency difference detector at the same frequency as the frequency of the power system before the disturbance.

3. A variable-speed generator/motor system, comprising a generator/motor having a primary winding and a secondary winding, the secondary winding being installed on the motor that is coupled to a prime mover/load, a main circuit interposed between a power system and the primary winding of the generator/motor, an excitation circuit including a frequency converter inserted between a part of the main circuit and the secondary winding of the generator/motor, sync means for receiving a first signal having a frequency and phase of the power system and for continuously producing a second signal representing the frequency and phase of the first signal, a frequency difference detector means receiving said second signal as an input for determining the difference between the second signal and a frequency dependent on the rotational speed of the prime mover/load and for outputting the difference as a third signal, and a phase-shift control device for controlling the firing phase of the frequency converter in the excitation circuit by use of the third signal provided by the frequency difference detector means as a reference signal whereby in the case of a disturbance occurring in the power system frequency that effects the first signal, the second signal is produced without interruption during the disturbance.

4. A variable-speed motor system, comprising a generator/motor having a primary winding and a secondary winding installed on the motor rotor coupled to a prime mover/load, a main circuit interposed between a power system and the primary winding of the motor, an excitation circuit including a frequency converter inserted between a part of the main circuit and the secondary winding of the motor, sync means receiving a first signal representative of a frequency and phase of the power system and for continuing to produce a second signal having the same frequency and phase as the first signal, a frequency difference detector for determining the difference between the second signal received as an output and a frequency dependent on the rotational speed of the load and for outputting the difference as a third signal, and a phase-shift control device for controlling the firing phase of the frequency converter in the excitation circuit by use of the third signal from the frequency difference detector as a reference signal.

5. A variable-speed system according to claim 3, wherein said sync means includes a starting electric machine, a synchronous motor and a synchronous generator arranged on the same axis, the synchronous generator producing the second signal as an output voltage that is applied to the frequency difference detector means as the second signal input.

6. A variable-speed system according to claim 4, wherein said sync means includes a starting electric machine, a synchronous motor and a synchronous generator arranged on the same axis, the synchronous generator producing said second signal as an output voltage applied to the frequency difference detector as the second signal input.

7. A variable-speed generator/motor system, comprising a generator/motor having a primary winding generating/operating on a primary winding frequency and a secondary winding installed on the motor rotor coupled to a prime mover/load, a main circuit interposed between a power system and the primary winding of the generator/motor, an excitation circuit including a frequency converter inserted between a part of the main circuit and the secondary winding of the generator/motor, frequency difference detector means for determining the difference between the frequency of the power system received as an input and a frequency dependent on the rotational speed of the prime mover/load received as another input and for outputting a phase signal, and a phase-shift control device for controlling the firing phase of the frequency converter in the excitation circuit by use of the phase signal from the frequency difference detector means as a reference signal, wherein said frequency difference detector means is further for producing the phase signal for keeping the frequency of the primary winding and the power system in synchronization by offsetting the frequency fluctuations of the frequency dependent on the rotational speed of the prime mover/load when a disturbance occurs in the power system.

8. A variable-speed motor system, comprising a motor having a primary winding operating on a primary winding frequency and a secondary winding installed on the motor rotor coupled to a load, a main circuit interposed between a power system and the primary winding of the motor, an excitation circuit including a frequency converter inserted between a part of the main circuit and the secondary winding of the motor, a frequency difference detector means for determining the difference between the frequency of the power system and a frequency dependent on the rotational speed of the load and for outputting a phase signal, and a phase-shift control device for controlling the firing phase of the frequency converter in the excitation circuit by use of the phase signal from the frequency difference detector as a reference signal, wherein the frequency difference detector produces the phase signal required for keeping the frequency of the primary winding and power system in synchronization by offsetting the frequency fluctuations of the frequency dependent on the rotational speed of the load when a disturbance occurs in the power system.

* * * * *